March 6, 1934.  H. R. SCHUTZ  1,949,435
OPTIC ATTACHMENT FOR GLASS BLOWING MACHINES
Filed Jan. 31, 1931  10 Sheets-Sheet 2
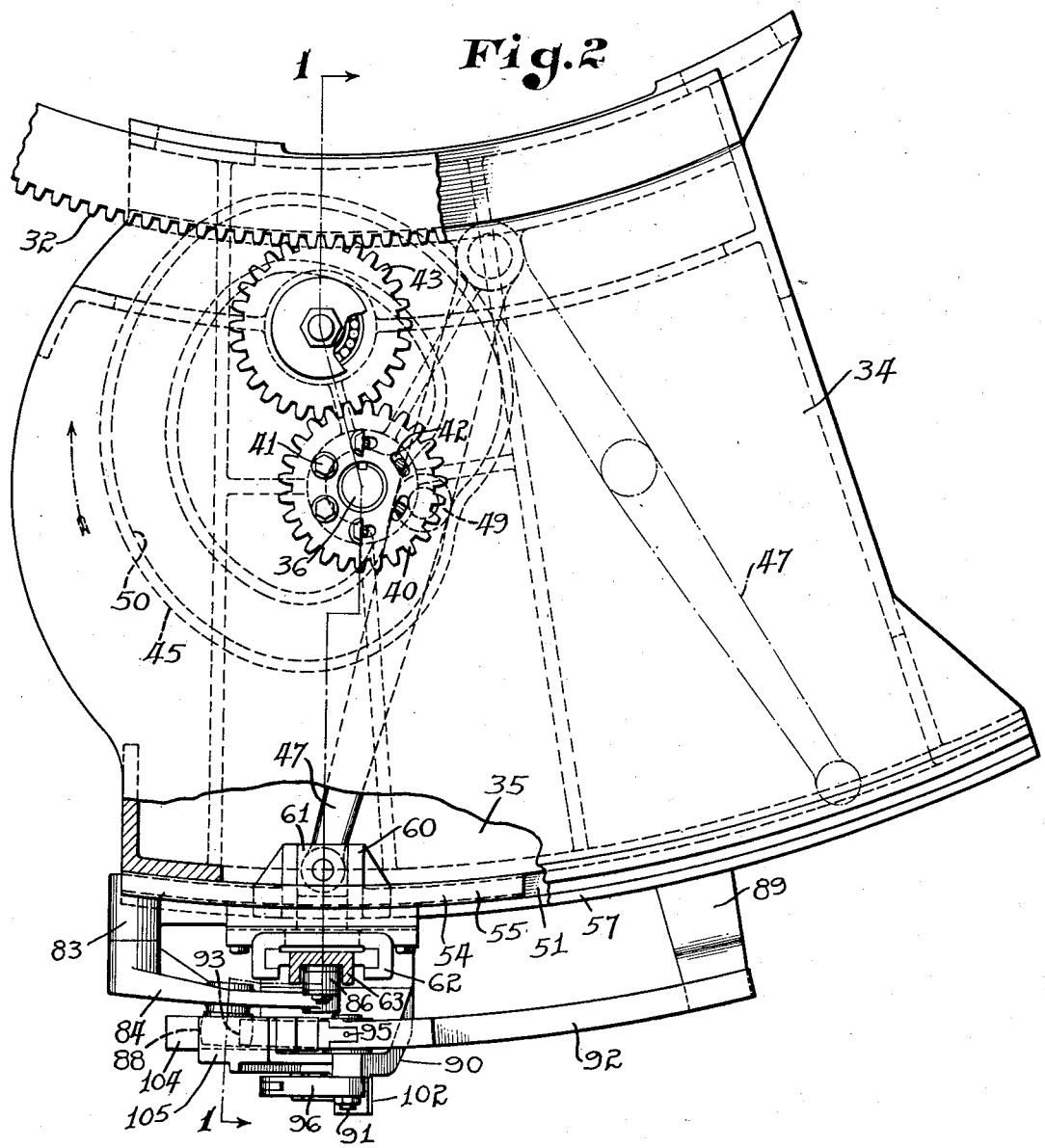
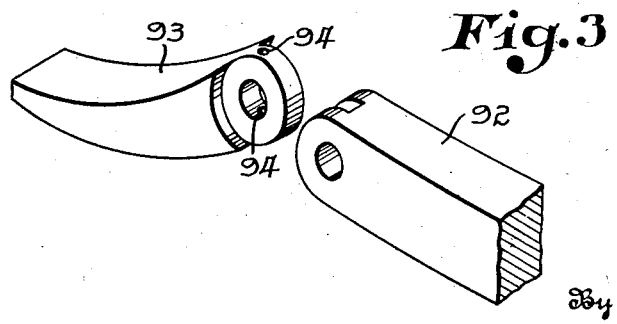
Inventor
Harold R. Schutz
By Owen & Owen
Attorneys

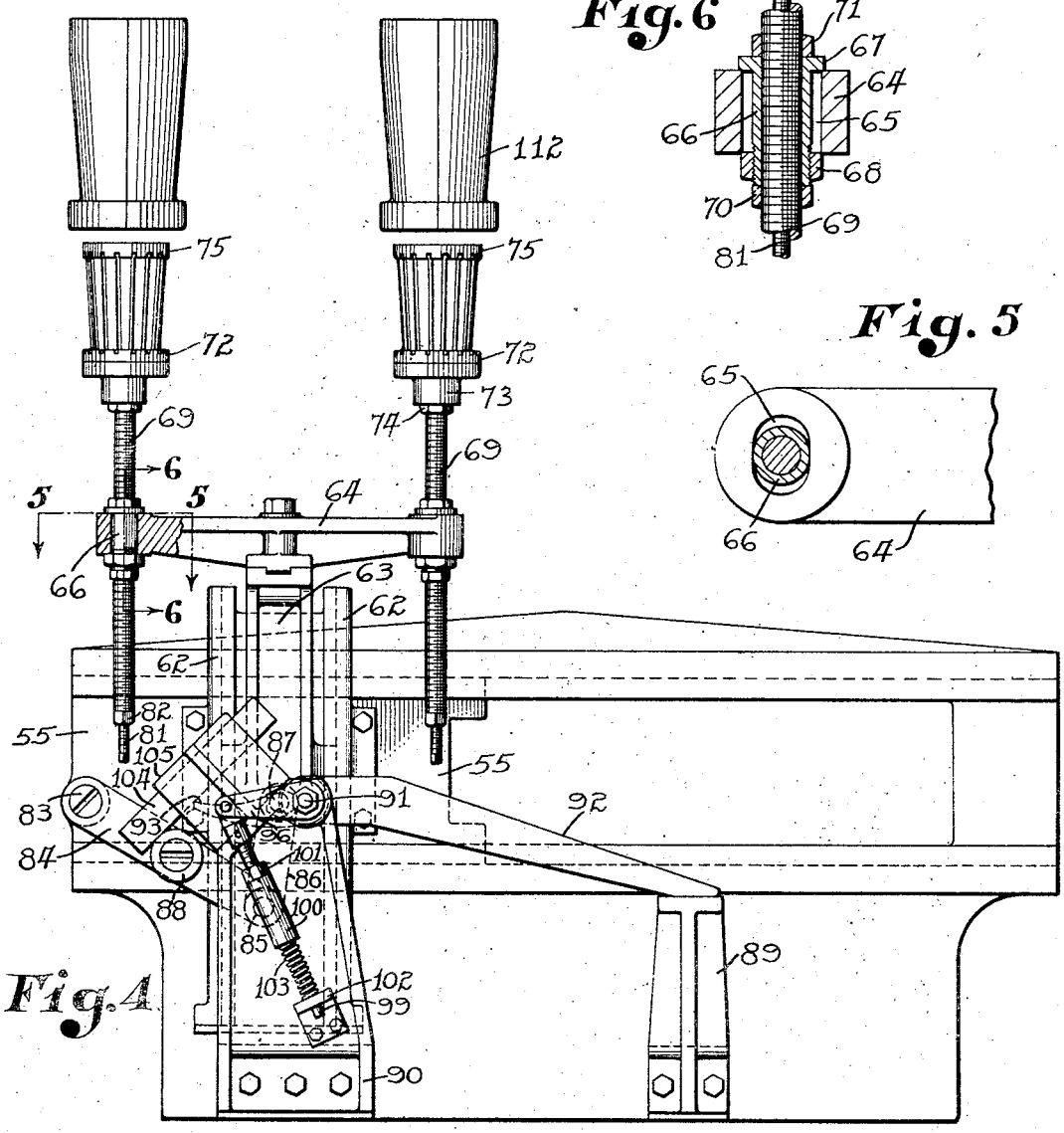

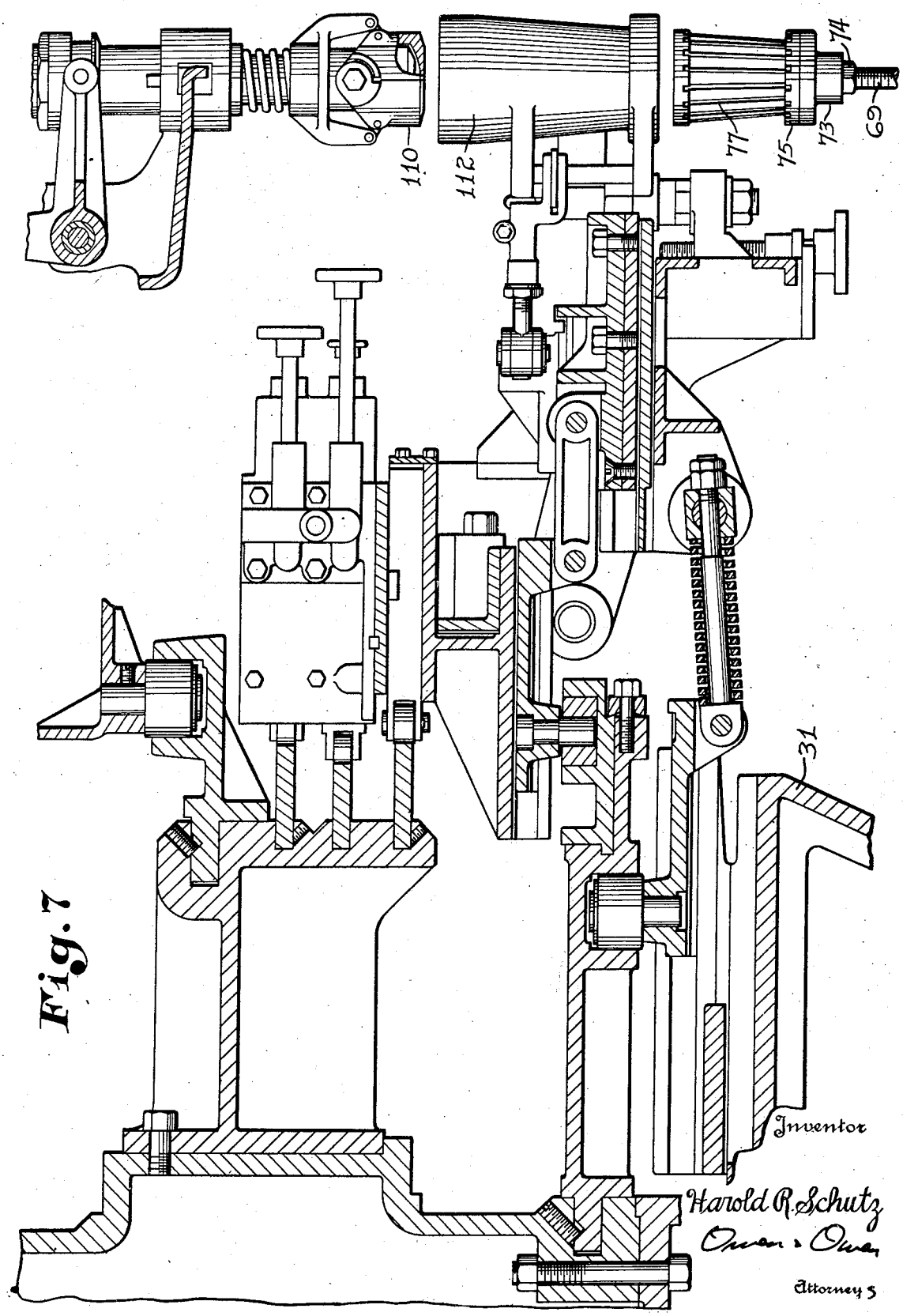

March 6, 1934. H. R. SCHUTZ 1,949,435
OPTIC ATTACHMENT FOR GLASS BLOWING MACHINES
Filed Jan. 31, 1931 10 Sheets-Sheet 5
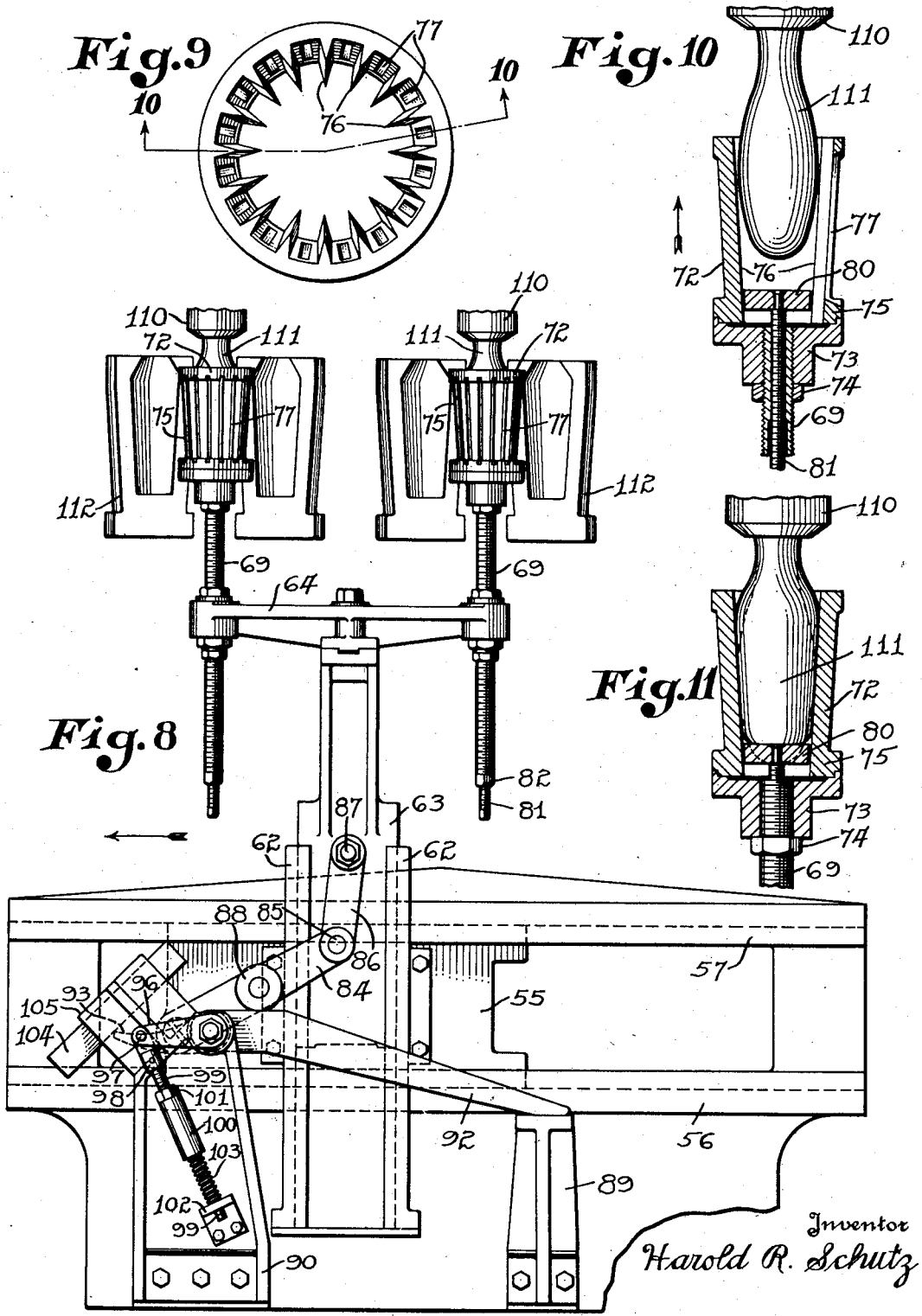
Inventor
Harold R. Schutz
By Owen & Owen
Attorneys March 6, 1934. H. R. SCHUTZ 1,949,435
OPTIC ATTACHMENT FOR GLASS BLOWING MACHINES
Filed Jan. 31, 1931 10 Sheets-Sheet 7
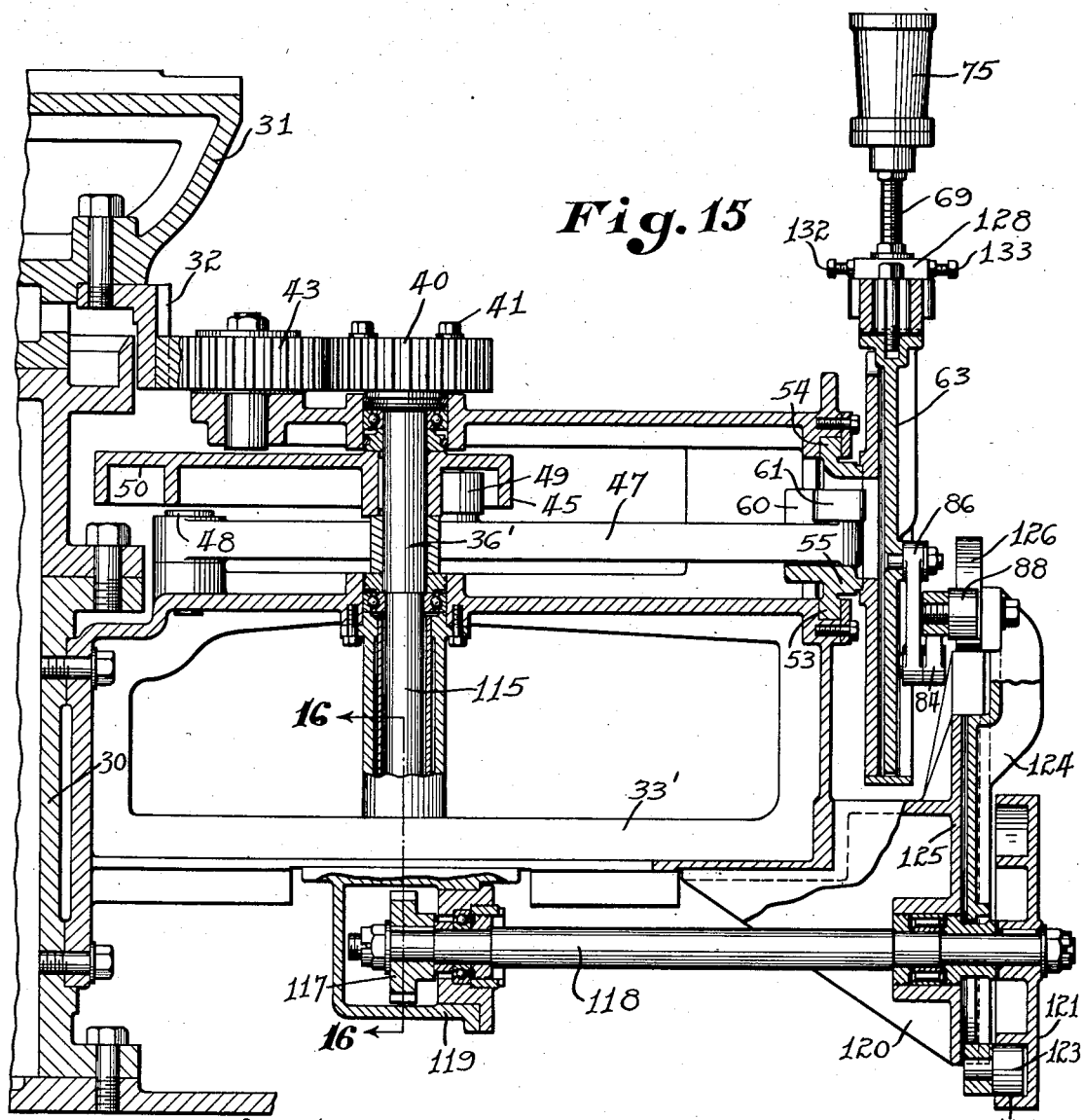
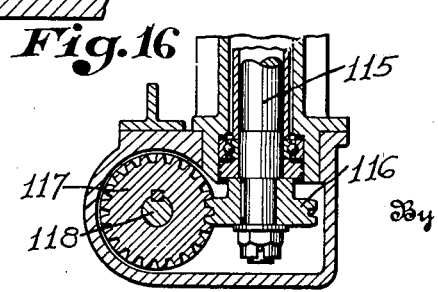
Inventor
Harold R. Schutz
By Owen & Owen
Attorneys March 6, 1934. H. R. SCHUTZ 1,949,435
OPTIC ATTACHMENT FOR GLASS BLOWING MACHINES
Filed Jan. 31, 1931 10 Sheets-Sheet 8
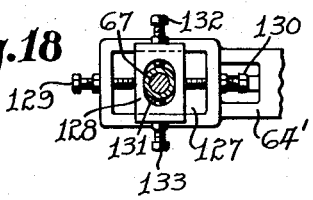
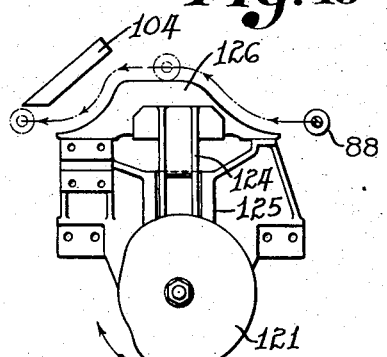
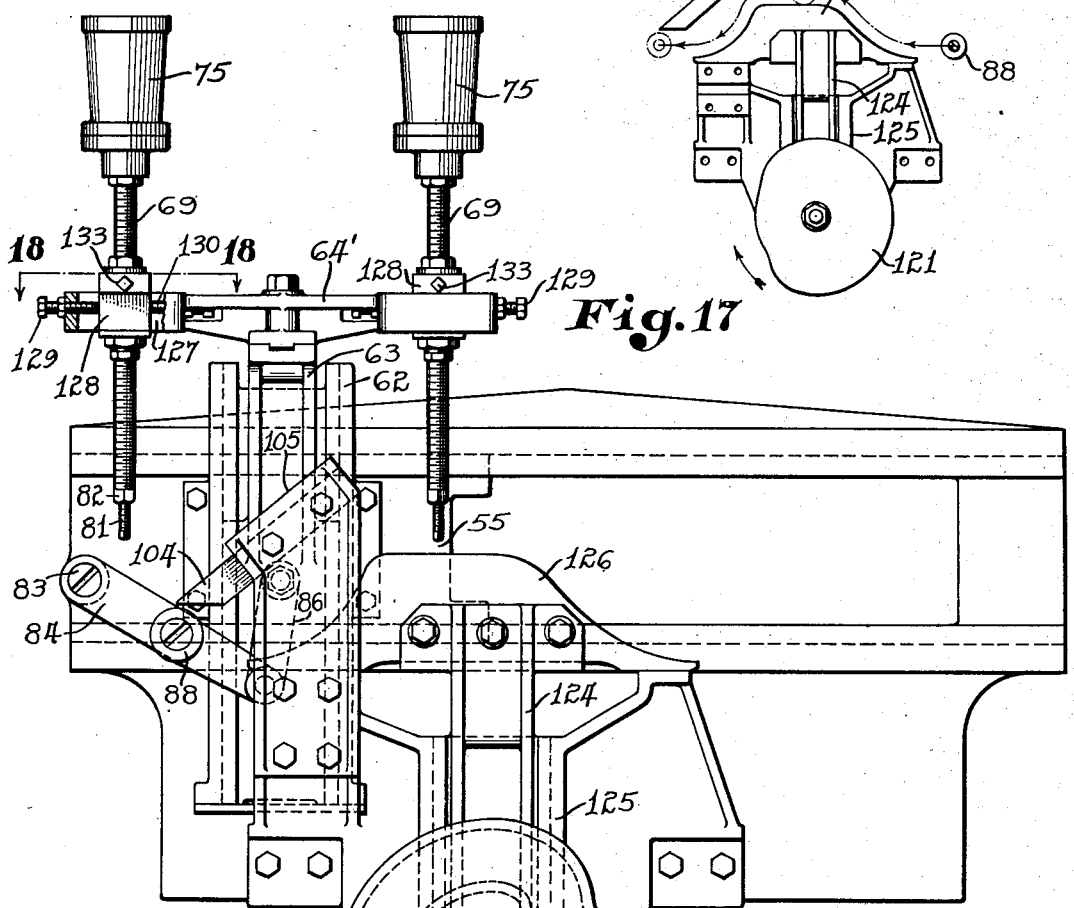
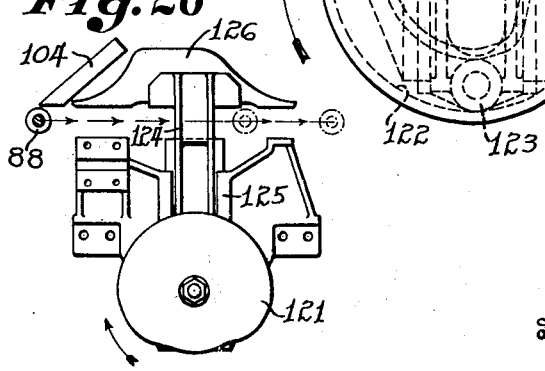
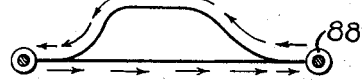
Inventor
Harold R. Schutz
By Owen & Owen
Attorneys March 6, 1934.  H. R. SCHUTZ  1,949,435
OPTIC ATTACHMENT FOR GLASS BLOWING MACHINES
Filed Jan. 31, 1931   10 Sheets—Sheet 9
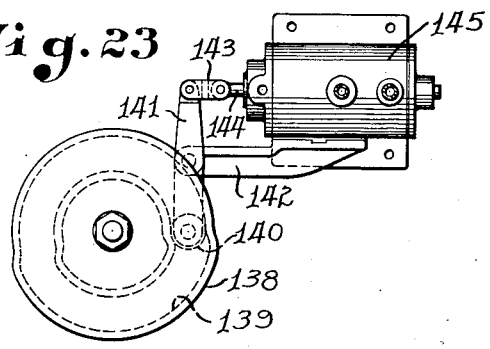
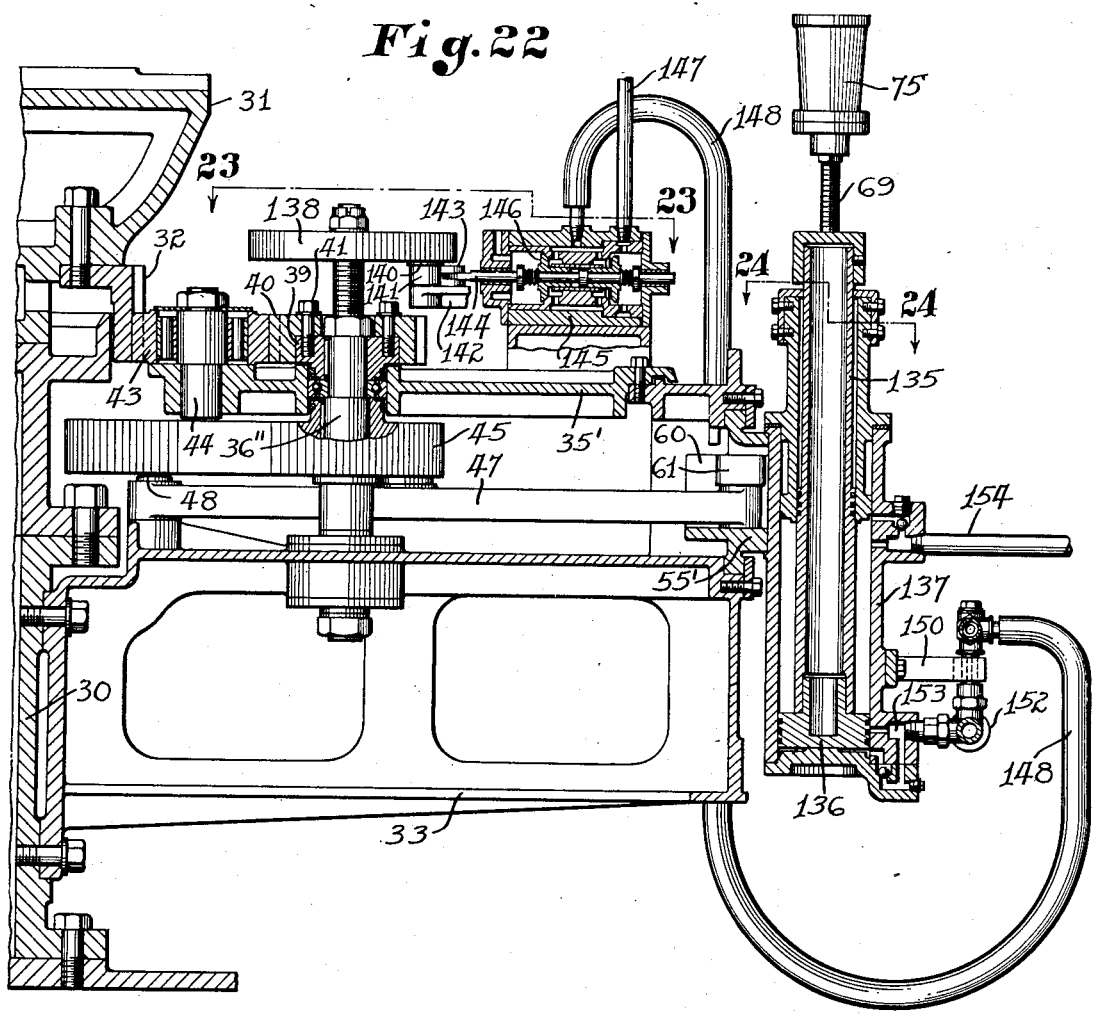
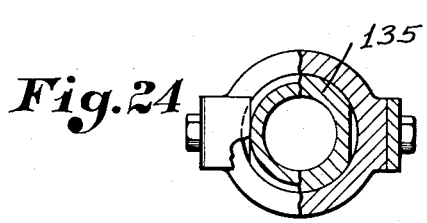
Inventor
Harold R. Schutz
By Owen & Owen
Attorneys

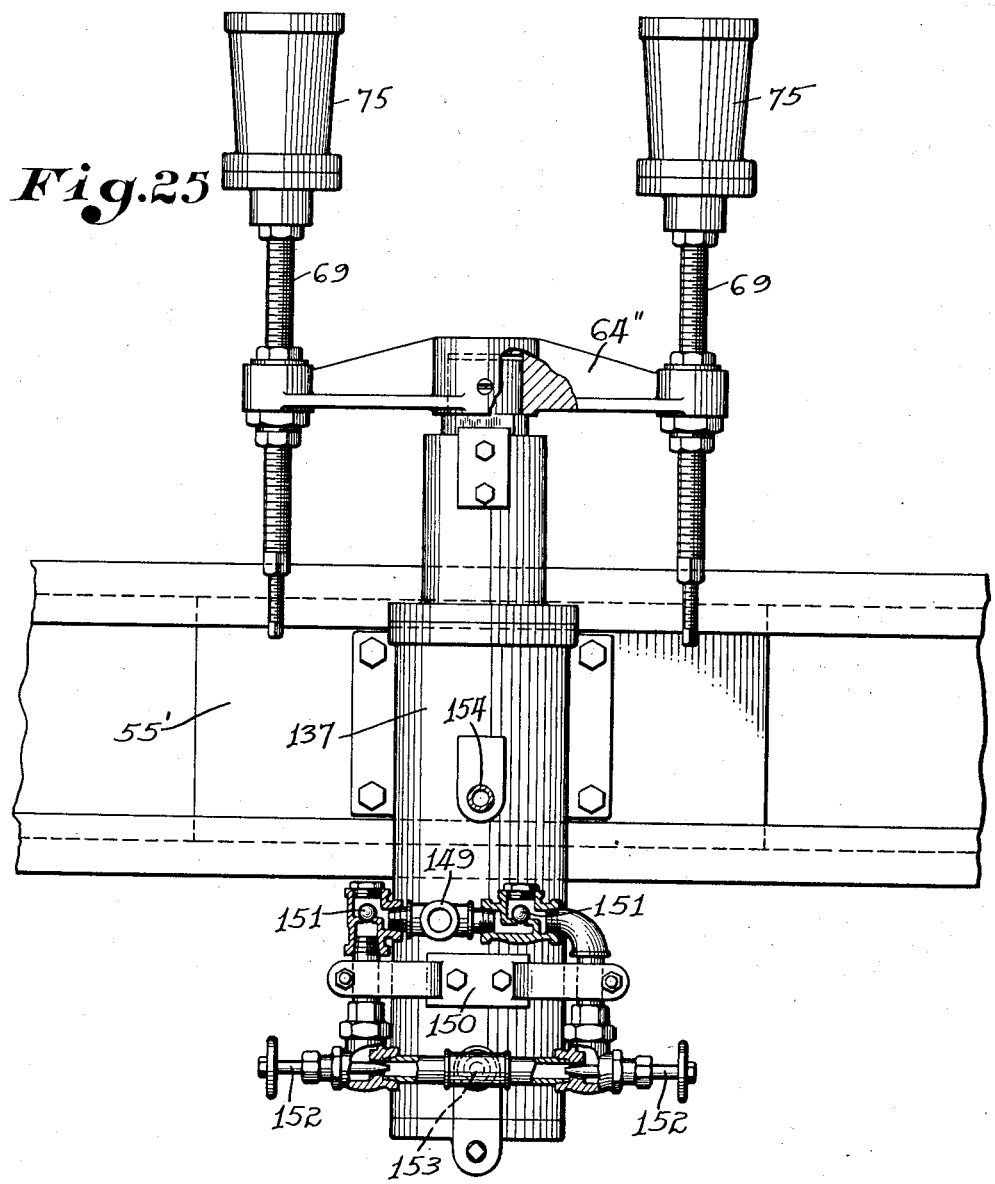

Patented Mar. 6, 1934

1,949,435

UNITED STATES PATENT OFFICE 1,949,435

OPTIC ATTACHMENT FOR GLASS BLOWING MACHINES

Harold R. Schutz, Toledo, Ohio, assignor to The Libbey Glass Manufacturing Company, Toledo, Ohio, a corporation of Ohio Application January 31, 1931, Serial No. 512,526

9 Claims. (Cl. 49—9)

This invention relates to an attachment for a glass blowing machine whereby a design may be formed on the partly blown blank which will appear in the fully blown article and which is commonly known as an "optic".

The object of the invention is to produce a design of this type with accuracy and reliability, without interfering with the regular operation of the blowing machine, and by means of a simple and reliable apparatus. Other objects and details of the invention will appear as the description proceeds.

Mechanism in accordance with the invention is shown in connection with a glass blowing machine of the type which has a plurality of glass blowing units rotating on a turret above a central column and which may be of the type shown in the patent of Kadow 1,527,556 on Glass working machine issued February 24, 1925.

Figure 1 of the drawings is a vertical radial section of one form of the attachment applied to a machine of the type described, and is taken on the line 1—1 of Figure 2.

Figure 2 is a plan view of the parts shown in Figure 1, parts being in section on the line 2—2 of Figure 1.

Figure 3 is a detail of a cam track.

Figure 4 is an elevation, partly in section, as viewed from the right of Figure 1.

Figures 5 and 6 are detail sectional views on the lines 5—5 and 6—6 respectively of Figure 4.

Figure 1:
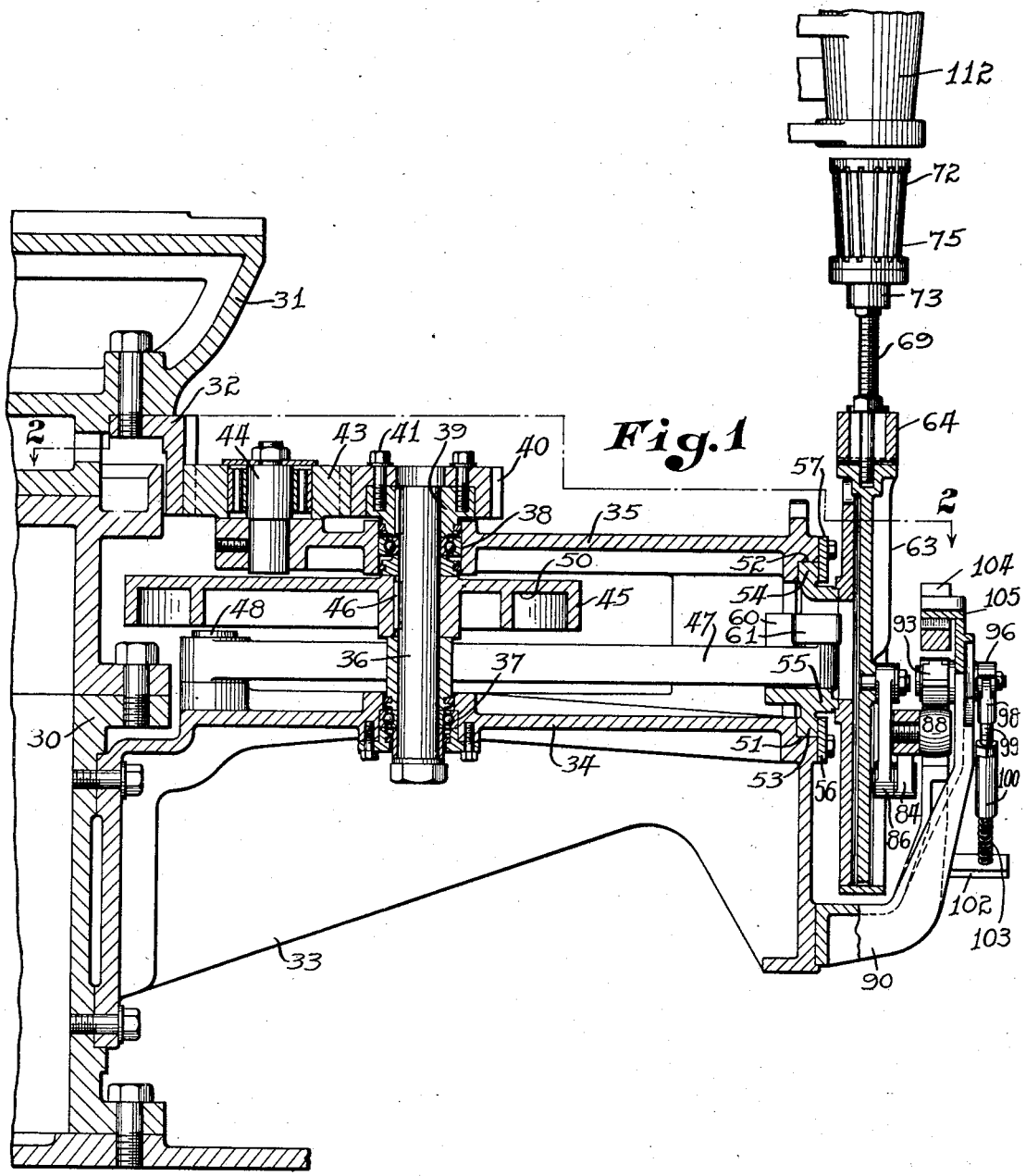

Figure 7 is a view of a portion of the glass blowing machine directly above the parts shown in Figure 1, showing the cooperation thereof with the attachment which constitutes this invention.

Figure 8 is a view similar to Figure 4, but showing the parts with the optic mold elevated.

Figure 9 is a plan view of one of the optic molds.

Figure 10 is a vertical section of an optic mold on the line 10—10 of Figure 9 and showing the mold as it is being raised about a glass blank.

Figure 11 is a view similar to Figure 10 but showing the relation of the mold and blank when the mold is fully raised.

Figure 12:
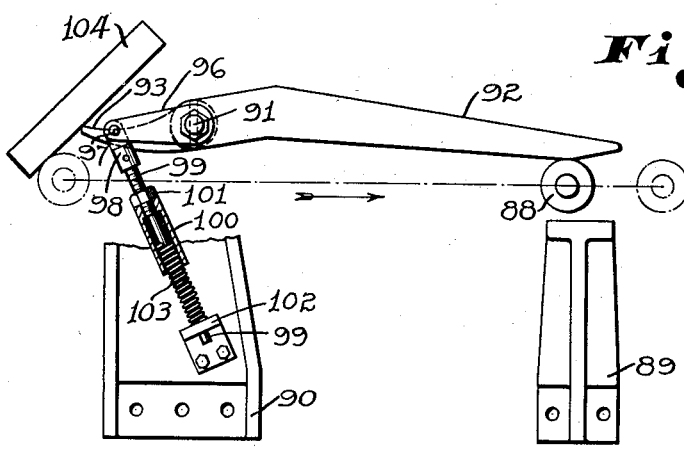
Figure 13:
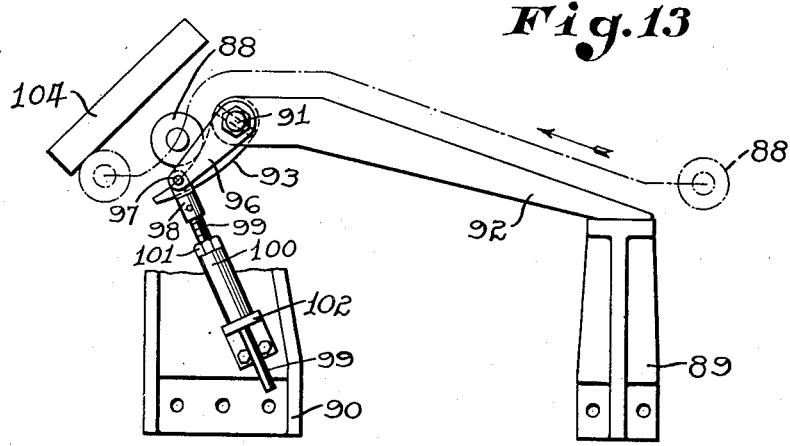
Figure 14:
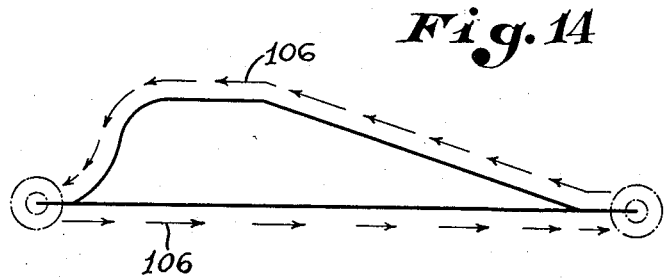

Figures 12, 13 and 14 are diagrammatic views showing the operation of the optic mold raising roller and cam track.

Figure 15 is a view similar to Figure 1 but showing a different form of construction for raising and lowering the optic mold.

Figure 16 is a detail section on the line 16—16 of Figure 15.

Figure 17 is an elevation of the device shown in Figure 16 as viewed from the right of that figure, parts being in section.

Figure 18 is a section on the line 18—18 of Figure 17.

Figures 19, 20 and 21 are diagrammatic views showing the operation of the optic mold raising device illustrated in Figures 15 and 17.

Figure 22 is another view similar to Figure 1 but showing pneumatic means for raising and lowering the optic mold.

Figure 23 is a plan view of a portion of the device as viewed from line 23—23 of Figure 22.

Figure 24 is a detail sectional view on the line 24—24 of Figure 22.

Figure 25 is an elevation of a portion of the device as viewed from the right of Figure 22, parts being in section.

In the construction shown it will be understood that there is provided the usual central base 30 above which there is shown a portion of a turret structure 31 which carries the various parts of the glass blowing machine. In the form illustrated there is provided a gear 32 at the bottom of the central portion of turret 31. This gear may be used to drive the turret.

It will be understood that a glass blowing machine of the type to which this attachment is applied is provided with means for receiving and carrying glass blanks which are automatically placed in proper relation with blow molds and are blown, and the blown articles are then discharged. This takes place while the turret is rotating.

On the base there is mounted a supporting bracket 33 at a point which the glass carrying devices pass after they receive the glass and before the blow molds close about the glass. As will be apparent from Figure 1, bracket 33 comprises a lower supporting plate 34 and an upper supporting plate 35. A shaft 36 is journaled at 37 in plate 34 and at 38 in plate 35 and carries above plate 35 a collar 39. A gear 40 is attached to collar 39 by means of screws 41 which pass through slots 42 in gear 40 into collar 39. A gear 43 is mounted on a stud shaft 44 rising from plate 35 between gear 40 and gear 32. By this means, when gear 32 is rotated with respect to base 30 and bracket 33, gear 40 is driven from gear 32 through gear 43, and thereby shaft 36 is rotated.

Between plates 34 and 35 there is a cam wheel 45 keyed at 46 upon shaft 36. Beneath cam wheel 45 is a lever 47 fulcrumed at 48 on plate 34. Lever 47 is provided on its upper surface with a roller 49 which enters cam groove 50 in the lower side of wheel 45.

At the outer edges of plates 34 and 35 there are grooves 51 and 52 in which there run flanges 53 and 54 of a slide member 55. Plates 56 and 57 hold flanges 53 and 54 in their respective grooves.

Slide 55 is provided between plates 34 and 35 with radial guides 60 between which there works a block 61 to which the outer end of lever 47 is pivoted. In this way slide 55 is oscillated back and forth with the movement imparted to lever 47 by cam wheel 45.

On the outer face of slide 55 there are attached guide members 62 between which there is guided a slide 63. Upon the upper end of slide 63 there is mounted a cross arm 64 having in each end thereof a vertical bore 65. As shown in detail Figures 5 and 6, there is a sleeve 66 passing through bore 65. On the upper end of sleeve 66 there is a flange 67 which rests upon the upper face of arm 64. A nut 68 is threaded upon the lower end of sleeve 66 and may be screwed against the lower face of arm 64 to lock the sleeve in position in bore 65. Another sleeve 69 is threaded through sleeve 66 and is locked in position thereon by lock-nuts 70 and 71. On the upper end of each sleeve 69 there is mounted an optic mold 72. As shown in Figures 10 and 11, this optic mold comprises a base 73 which is threaded upon the upper end of sleeve 69 and is locked in adjusted position thereon by a nut 74. Upon this base there is mounted the mold proper 75. In the form illustrated this mold is substantially circular in cross section, but larger at the top than at the bottom. The mold is provided with inwardly directed wedge shape projections 76 between which there are slots 77.

In the bottom of the mold there is a stop member 80 attached to the upper end of a rod 81 which is threaded into a sleeve 69 and is locked in position within the sleeve by a lock-nut 82.

Upon slide 55 there is pivoted at 83 a lever 84 to the free end of which there is pivoted at 85 a link 86 the other end of which is pivoted at 87 to slide 63. Lever 84 carries midway between its ends a roller 88. Outside of the path of slide 55 there are supporting brackets 89 and 90. At the upper end of bracket 90 there is a pin 91. A cam track member 92 is pivoted on pin 91 and extends to the right, as viewed in Figure 4, this right end resting upon bracket 89. Likewise pivoted at 91, there is a cam track member 93 which extends to the left from pin 91 as viewed in Figure 4. Member 92 is loosely mounted upon pin 91 but member 93 is fixed to pin 91. As shown in Figure 3, there are holes 94 in member 93, and a pin 95 passing through these holes and member 91 secures cam member 93 upon pin 91. The outer end of pin 91 carries an arm 96 to the outer end of which there is pivoted at 97 a block 98 carrying a screw threaded member 99 entering a sleeve 100 and locked in adjusted position in the sleeve by a lock-nut 101. The smooth lower end of member 99 extends through sleeve 100 and through a lug 102 on a bracket 90. A spring 103 surrounds the lower end of rod 99 and normally urges it upward.

It will be seen that, when slide 55 is in extreme right position, as it will be when lever 47 is in its dotted line position in Figure 2, the optic molds will be lowered, as slide 63 is permitted by lever 84 to rest at that time on the bottom of its slide-way. As the slide is moved to the left, roller 88 encounters cam member 92 and runs up thereon to the position in which it is shown in Figure 8. As the slide continues to move to the left, roller 88 passes pin or rock shaft 91 and rests upon cam track member 93. The weight of slide 63 and the parts carried thereby is sufficient to overcome spring 103 and press track member 93 downward so that as the slide continues to move to the left it is gradually lowered by the spring. However, there is an abutment member 104 mounted on a bracket 105 in position to stop the movement to the left of roller 88 and compel it to move downward to the position in which it is shown in Figure 4, even if the weight of the parts carried by slide 63 should not be sufficient to overcome the resistance of spring 103. Immediately after roller 88 passes the end of member 93, spring 103 snaps that member back to its upper position as shown in Figure 4. Thereafter, the slide is moved back to the right and the roller moves beneath member 92, raising the member as it passes over bracket 89, as indicated in Fig. 12. Fig. 13 shows roller 88 running down track 93, and Fig. 14 shows diagrammatically by the arrows 106 the path of roller 88 during one complete cycle. The raised spot mold moves with the turret, but the return movement of the lowered mold is rapid.

As previously indicated, the glass blowing machine mounted upon the turret comprises a plurality of units which pass over the spot molds in succession. Each of these units comprises a pair of glass holding devices 110 each adapted to hold a gather 111 of glass. There are also provided molds 112 in position to close about the gathers of glass and determine their form when blown. As will clearly appear from Fig. 7 to 11 inclusive, the spot molds 75 are operated in relation to the glass blowing machine so that they rise between opened molds 112 and about glass gathers 111 therein. Fig. 10 shows the spot mold rising about the glass gather and Fig. 11 shows the spot mold in its uppermost position. Just as the spot mold reaches its upper position a slight puff of air is introduced into the parison 111 so as to insure that its walls will lightly touch against projections 76. Preferably these projections do not make any actual indentations in the glass, but merely touch and chill its surface. For this reason there is no difficulty in withdrawing the spot mold downwardly from engagement with the glass, even if the design of the spot mold is different from that indicated in the drawings, wherein the lines are longitudinal of the parison. If preferred, diamond-shaped or other designs may be imparted by the spot mold in the same manner. In order to more fully insure the withdrawal of the spot mold without blurring the design impressed by chilling upon glass, it is preferable to release the slight puff of air, mentioned above, before or just as the spot mold is lowered.

It will be readily understood that after the spot mold is lowered the blow molds are closed during the continued rotation of the turret. The glass is blown into the blow mold, and during this blowing the slightly chilled areas of glass stretch less than the intermediate portions, and, therefore, the glass walls of the blown article are thicker along the lines which have been chilled than they are at other points. Since the glass is turned in the smooth mold during blowing, the thickening must project on the inside instead of the outside. Because of the varying thickness of the glass and its consequent varying fraction of light, there is a design impressed upon the glass of the character known in the trade as "optic".

In Figs. 15 to 21 there is disclosed a modified means for raising and lowering the optic mold. Since many of the parts are the same as in the form previously described, the same reference numerals are used for the unchanged parts.

In this modified form there is a downward extension 115 of shaft 36', corresponding to shaft 36 previously described. At the lower end, extension 115 is provided with a worm 116 which engages a worm wheel 117 on a shaft 118 which is journaled in brackets 119 and 120 extending downward from bracket 33'. At the outer end of shaft 118 there is a cam wheel 121 provided with a cam groove 122 in which there runs a roller 123 mounted upon the lower end of a slide 124 which slides in a vertical guideway 125 in bracket 120. A cam 126 is mounted upon the upper end of slide 124. The parts are so arranged that when lever 47 has positioned slide 55 to the right, cam 126 is in its downward position so that roller 88 runs up over the upper face of cam 126 when moving to the left. After roller 88 has passed to the left of cam 126, slide 124 is raised so that, upon the return movement of roller 88 to the right, it runs under cam 126, as clearly illustrated in diagrammatic Figs. 19, 20 and 21.

There is also shown in Figs. 17 and 18 a modified means for adjusting the exact position of the spot molds. This is done by providing arm 64' with an opening 127 rectangular in cross section, and in which there slides a block 128. Block 128 may be positioned at the desired point longitudinal of slot 127 by means of screws 129 and 130. Within block 128 there is an oval opening 131 in which sleeve 67 may slide laterally of the arm. Screws 132 and 133 affix member 67 in its adjusted position. It will be seen that the position of the spot molds 75 can be accurately adjusted in the horizontal plane by this mounting. This adjustment is necessary in order that the glass blanks may be equally contacted on all sides. It will be readily understood that even a slight departure from proper alinement of the spot mold with the glass carriers would result in too heavy contact between the spot mold and the glass on one side and too light contact, or failure to contact at all on the other side.

In the construction shown in Figs. 22 to 25 inclusive there is another form of device for raising and lowering the spot molds. In this construction, the spot mold arms 64'' are mounted upon the upper end of a piston rod 135 which rises from a piston 136 working in a cylinder 137 mounted upon slide 55'. In this form of the device shaft 36'' is extended upward and has mounted thereon a cam wheel 138 having therein a cam track 139 in which there runs a roller 140 on one end of a lever 141 fulcrumed on a bracket 142 and having its other end connected by a link 143 with a valve stem 144. Valve casing 145, to which bracket 142 is attached, is mounted upon the upper side of plate 35' and contains a valve 146 controlling the passage of air from a supply pipe 147 to a pipe 148 which is connected with a fixture 149 mounted upon a bracket 150 on the lower end of cylinder 137. Fixture 149 is connected through check valves 151 and needle valves 152 to a passage 153 opening into the lower end of cylinder 137. Pipe 154 leads from a source of compressed air into cylinder 137 above piston 136. When valve 146 connects the lower end of the cylinder with compressed air, the pressure on the greater area of the lower end of the piston results in elevating the piston and the spot molds 75 carried thereby. When air is exhausted from the lower end of the cylinder, the pressure constantly operating upon the upper side of the piston, together with gravity, results in the lowering of the piston and the spot molds. Otherwise, the operation of this device is similar to that previously described.

It will be understood that one of the check valves 151 permits the air to pass towards the cylinder and the other permits the air to pass from the cylinder. By this arrangement needle valves 152 may be adjusted to separately control the speed at which the spot molds are elevated or lowered.

The two spot molds shown are adapted to cooperate with two gathers of glass carried by one double spindle swinging device, such as shown in the patent to Kadow No. 1,315,130, for example, but it is obvious that a single spot mold might be used with single spindle glass carrying unit on the turret. Cam track 50 is shaped to move the spot molds at the same speed as the turret while the molds are in contact with the glass, but the return movement is rapid, so that the molds may travel with each unit of the turret for more than one half of the distance between the units.

By using the two spot molds with a plurality of gathering units the spot molds are contacted with the glass more frequently than they would be if there were one spot mold for each spindle. As a result, the spot mold is kept warm without other heating means so as to be at the desired temperature for forming a desirable appearance in the finished glass. The spot molds can be used readily with from six to twelve gathering units in the type of machine described.

While one form of mechanism for operating the spot molds has been described in detail and some alternative constructions have been indicated, it will be understood that other variations are possible within the scope of the appended claims.

What I claim is:

1. In glass shaping apparatus, a series of glass carriers, means to move the carriers in succession past a given point, a spot mold having interior projections forming a pattern and adapted to contact glass only at the points of the projections, and means to move the mold to and from cooperative relation with successive carriers and synchronously with the successive carriers as they pass said point.

2. In glass shaping apparatus, a series of glass carrying spindles, means to move the spindles in succession past a given point with the glass thereon presented downwardly as they pass said point, a mold, and means to raise and lower the mold to and from cooperative relation with successive gathers of glass on the successive spindles as they pass said point, said means moving the mold synchronously with the spindles while the mold is in cooperative relation with the glass.

3. In glass shaping apparatus, a series of glass carriers, means to move the carriers in succession past a given point, a spot mold having interior projections forming a pattern and adapted to contact glass only at the points of the projections, and means to move the mold to and from cooperative relation with successive carriers and synchronously with the successive carriers as they pass said point.

4. In glass shaping apparatus, a series of glass carrying spindles, means to move the spindles in succession past a given point with the glass thereon presented downwardly as they pass said point, a spot mold having interior projections forming a pattern and adapted to contact glass only at the points of the projections, and means to raise and lower the mold to and from cooperative relation with successive gathers of glass on the successive spindles as they pass said point, said means moving the mold synchronously with the spindles while the mold is in cooperative relation with the glass.

5. In glass shaping apparatus, a turret, means for rotating the turret continuously, a plurality of glass carrying spindles arranged in a circle on said turret, a spot mold having interior projections forming a pattern adapted to contact the glass only at the points of the projections, and means to raise and lower the mold to and from cooperative relation with the glass and to move the mold horizontally with successive carriers while the mold is raised and horizontally in the opposite direction from the movement of the carriers while the mold is lowered.

6. Apparatus in accordance with claim 5 and in which the movement of the mold in the reverse direction from the movement of the glass carrying device is more rapid than the movement of the glass carrying devices.

7. In glass shaping apparatus, a turret, a plurality of glass carrying units mounted in a circle upon said turret, each unit comprising two glass carrying spindles, means for rotating the turret continuously, means for positioning the glass carrying spindles with the glass thereon downward as the spindles pass a given point, spot molds having inwardly projecting patterns thereon and adapted to contact glass only at the points forming said patterns, said spot molds being positioned apart the same distance as the two spindles of one unit, means for raising and lowering the spot molds to and from cooperative relation with the glass on the spindles as they pass said point, means for moving the spot molds horizontally synchronously with the glass while the spot molds are raised and means for rapidly returning the spot molds while lowered, to a position from which they may be raised into cooperative relation with glass carried by a succeeding unit.

8. In glass shaping apparatus, a series of glass carriers, a mold having a raised design on the interior thereof, and means for bringing the mold into cooperative relation with the glass on the carriers successively, said cooperative relation being such that the glass is contacted only by the raised points of the design.

9. In glass shaping apparatus comprising a plurality of rotatable spindles each adapted to carry a gather of glass and molds within which the glass is blown and rotated by said spindles, a spot mold, and means for bringing the spot mold into cooperative relation successively with gathers of glass on different spindles before the glass is enclosed in the blow molds.

HAROLD R. SCHUTZ.